(12) United States Patent
Dyke (10) Patent No.: US 8,857,210 B1
(45) Date of Patent: Oct. 14, 2014

(54) FOOD CHILLING SYSTEM

(71) Applicant: Deborah Dyke, Newbury Port, MA (US)

(72) Inventor: Deborah Dyke, Newbury Port, MA (US)

(*) Notice: Subject to any disclaimer, the term of this patent is extended or adjusted under 35 U.S.C. 154(b) by 0 days.

(21) Appl. No.: 14/060,347

(22) Filed: Oct. 22, 2013

Related U.S. Application Data (63) Continuation-in-part of application No. 12/855,599, filed on Aug. 12, 2010.

(51) Int. Cl.
*F25D 3/08* (2006.01)
*F25D 31/00* (2006.01)
*A23L 3/36* (2006.01)

(52) U.S. Cl.
CPC ............... *A23L 3/36* (2013.01); *F25D 31/006* (2013.01); *F25D 3/08* (2013.01); *F25D 2331/80* (2013.01)
USPC .......................... 62/457.2; 62/457.1; 62/457.6

(58) Field of Classification Search
CPC ........................................ F25D 31/00–31/008
USPC .............. 62/371, 457.1–457.5, 457.7–457.8; 220/547.2, 592.01, 592.16; 215/12.1, 215/12.2, 13.1
See application file for complete search history.

(56) References Cited

U.S. PATENT DOCUMENTS

| | | | |
|---|---|---|---|
| 3,830,676 A | 8/1974 | Elkins | |
| 5,005,374 A | 4/1991 | Spitler | |
| 5,188,877 A | 2/1993 | Magaro | |
| 5,345,784 A | 9/1994 | Bazemore et al. | |
| 5,988,879 A | 11/1999 | Bredderman et al. | |
| D424,371 S | 5/2000 | Delmonte | |
| D440,468 S | 4/2001 | Cornejo | |
| 6,223,551 B1 | 5/2001 | Mitchell | |
| 6,948,334 B1 | 9/2005 | Challenger | |
| 7,089,757 B2 | 8/2006 | Yang | |
| 7,332,011 B1 | 2/2008 | Sandberg | |
| D605,470 S | 12/2009 | Sluiman | |
| 2002/0095946 A1 | 7/2002 | Greene | |
| 2008/0066490 A1 | 3/2008 | Santeler | |
| 2009/0077997 A1 | 3/2009 | Lowrey et al. | |

*Primary Examiner* — Cheryl J Tyler
*Assistant Examiner* — Antonio R Febles (57) ABSTRACT

A food chilling system for keeping food items and beverages cold features a flexible circular base for wrapping a serving container. The circular base features a plurality of chilling components containing a freezable liquid or gel in a sealed cavity. The circular base features a plurality of spacing components alternatingly located between the chilling components. The circular base features a plurality of flexible handles pivotally located on a base outside periphery. The circular base features a plurality of rings pivotally located on a base sidewall. An elastic cord having a first hook and a second hook is designed to alternately pass through or engage the plurality of rings. The system features a pliable outer shell, having a cinchable opening designed to encompass the base and the cord after the base has been secured to the container via the cord.

8 Claims, 9 Drawing Sheets

FOOD CHILLING SYSTEM

CROSS REFERENCE

This application is a continuation-in-part to U.S. patent application Ser. No. 12/855,599, filed Aug. 12, 2010, the specification(s) of which is/are incorporated herein in their entirety by reference.

FIELD OF THE INVENTION

The present invention relates to food storage accessories, or more specifically, food storage accessories for maintaining a desired temperature.

BACKGROUND OF THE INVENTION

It can often be difficult to keep some beverages and foods cold and others hot during outdoor events. Ice buckets full of ice may be used, however the ice quickly melts creating a liquid mess. The present invention features a food chilling system for helping to keep various food items and beverages cold which can help prevent food from spoiling. The food chilling system of the present invention is used for outdoor events such as picnics, camping, beach trips, or outdoor parties.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a food chilling system for helping keep food items and beverages cold. In some embodiments, the system comprises a generally flexible circular base for wrapping a serving container. In some embodiments, the circular base comprises a circular and pliable bottom component centrally located in the circular base.

In some embodiments, the circular base comprises a plurality of chilling components. In some embodiments, each chilling component comprises a sealed cavity located therein. In some embodiments, a freezable liquid or gel component is located in the sealed cavity. In some embodiments, the circular base comprises a plurality of spacing components. In some embodiments, the chilling components are attached to the circular bottom alternatingly with the spacing components.

In some embodiments, the circular base comprises a plurality of flexible handles pivotally located on a base outside periphery. In some embodiments, each handle comprises a first position extending out and away from the base outside periphery, and a second position, folded over a container edge.

In some embodiments, the circular base comprises a plurality of rings pivotally located on a base sidewall thereon. In some embodiments, the system comprises an elastic cord having a first hook located on a cord first end and a second hook located on a cord second end. In some embodiments, the first hook and the second hook are designed to alternately pass through or engage the plurality of rings.

In some embodiments, the system comprises a flexible, pliable outer shell, having a cinchable opening located thereon. In some embodiments, the shell is designed to encompass the base and the cord after the base has been secured to the container via the cord.

DESCRIPTION OF PREFERRED EMBODIMENTS

Figure 1:
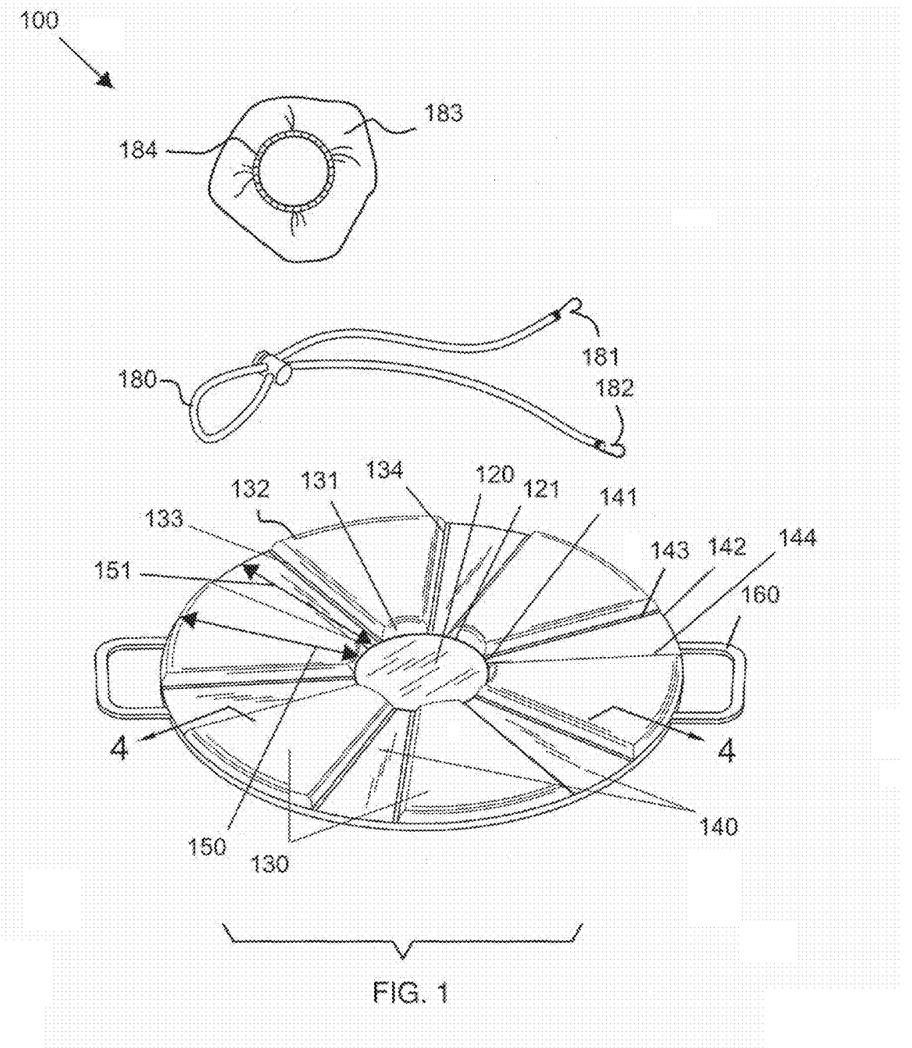
FIG. 1 shows a perspective view of the circular base of the present invention before assembly.
Figure 2:
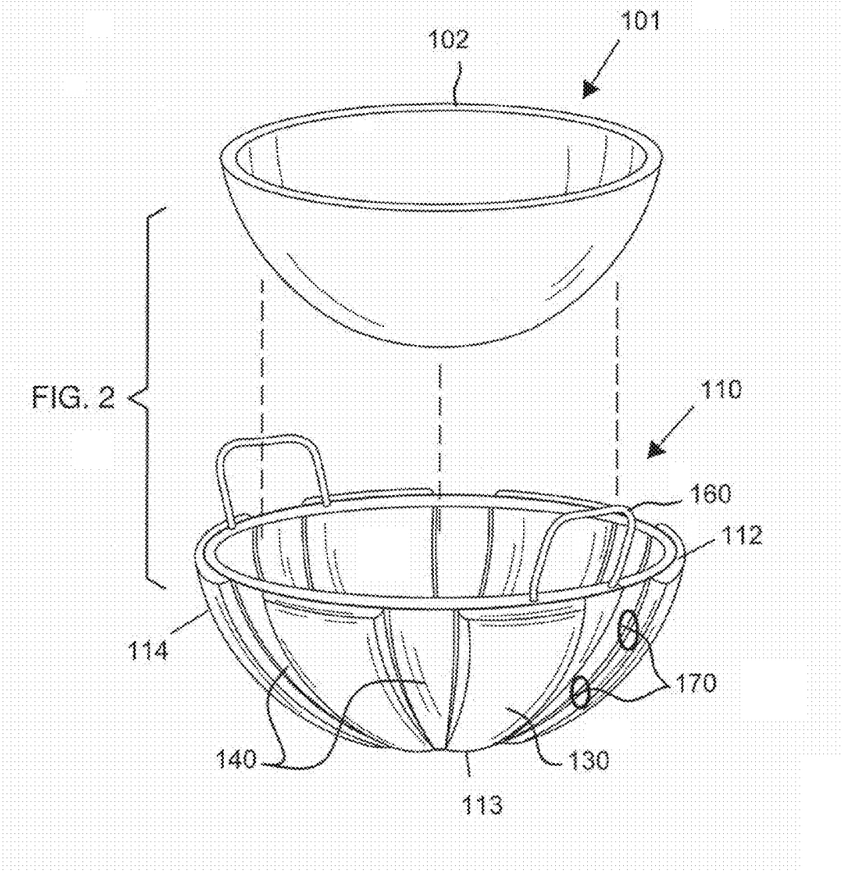
FIG. 2 shows a side view of the serving container and the circular base of the present invention during assembly.
Figure 3:
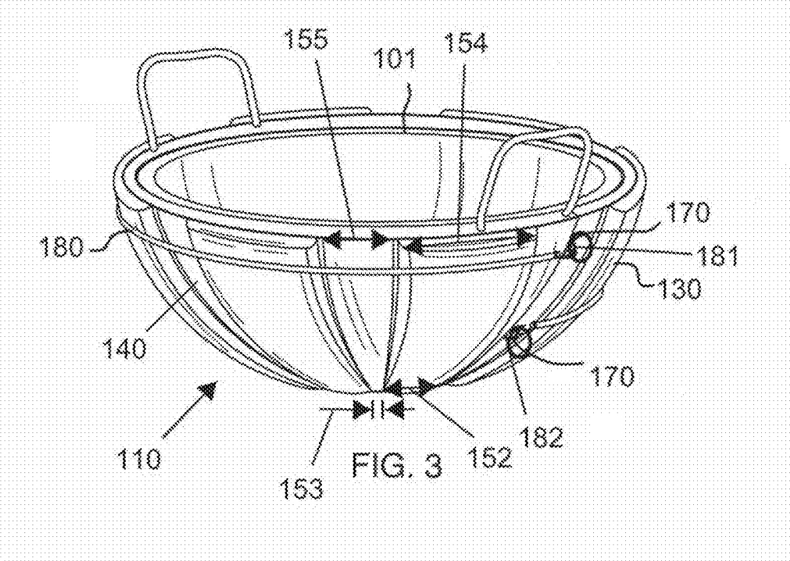
FIG. 3 shows a perspective view of the serving container, the circular base, and the cord of the present invention during assembly.
Figure 4:
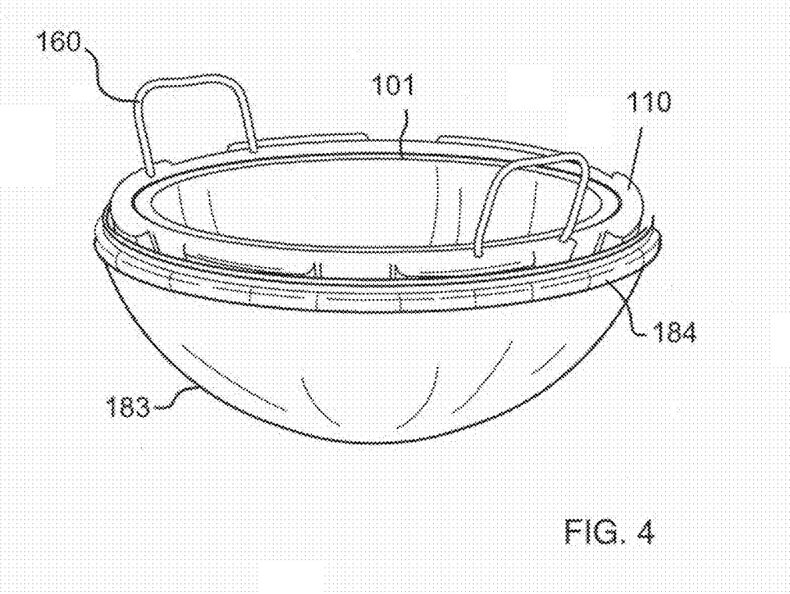
FIG. 4 shows a perspective view of the present invention after assembly.
Figure 5:
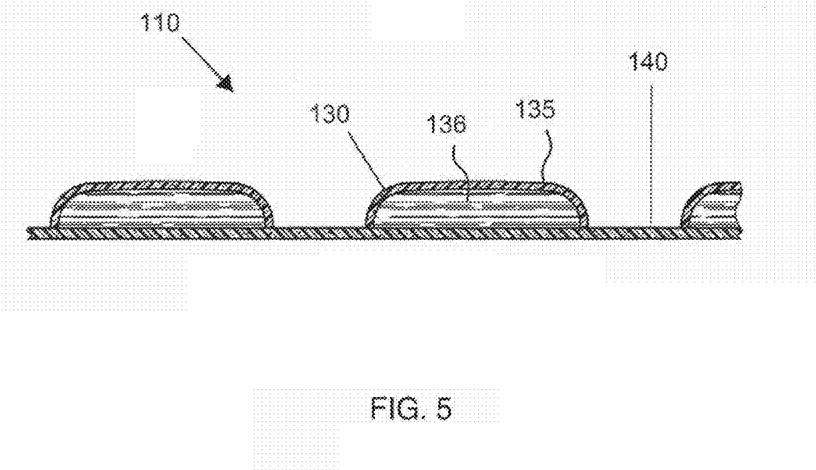
FIG. 5 shows a cross-section of the chilling component of the present invention.
Figure 6:
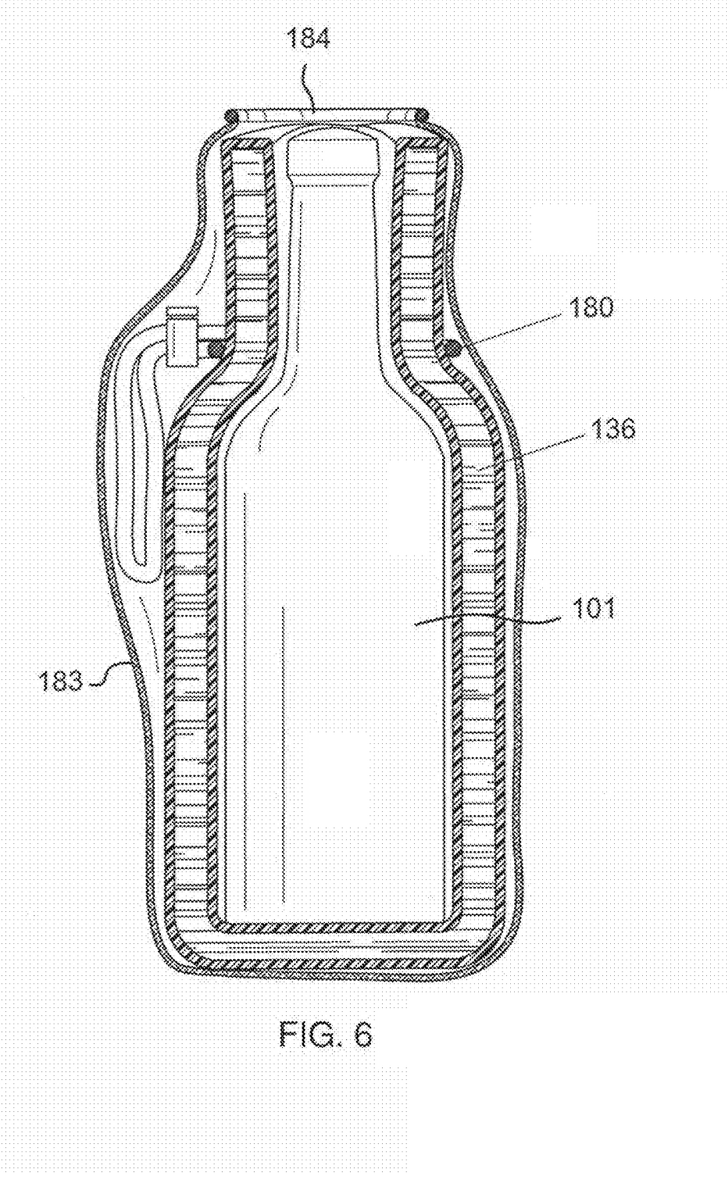
FIG. 6 shows a cross-section of the present invention featuring an alternate embodiment of the serving container.
Figure 7:
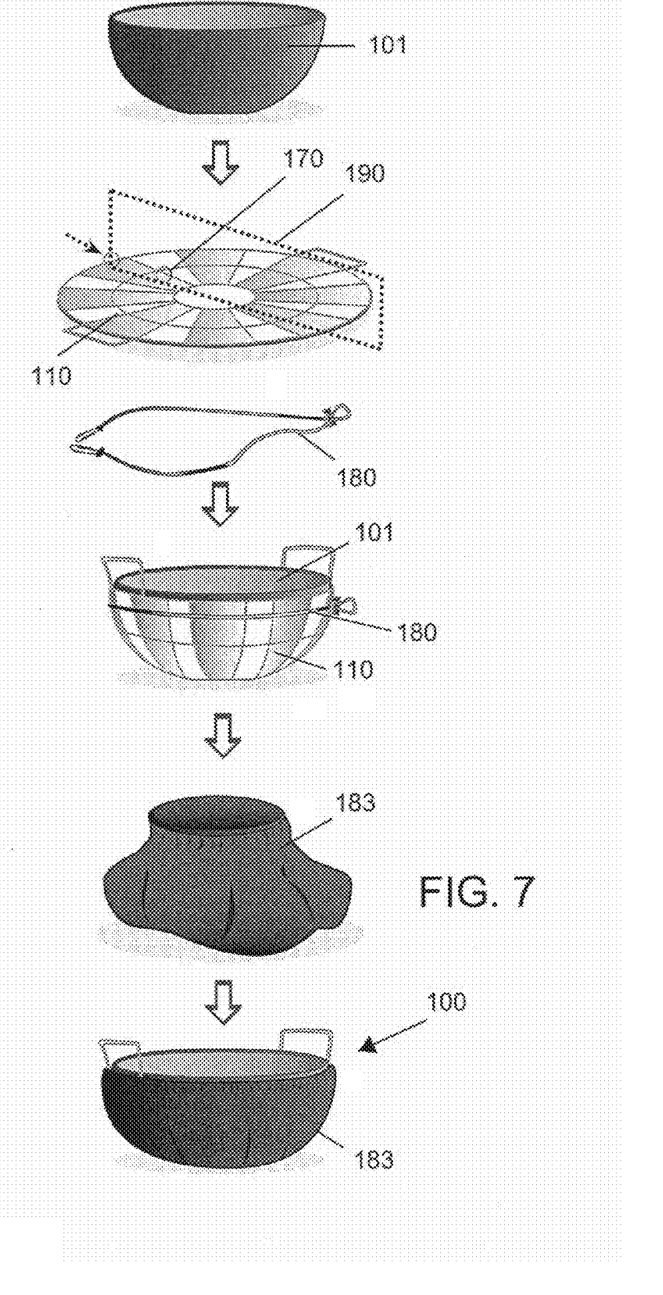
FIG. 7 shows an exploded view of the present invention.
Figure 8:
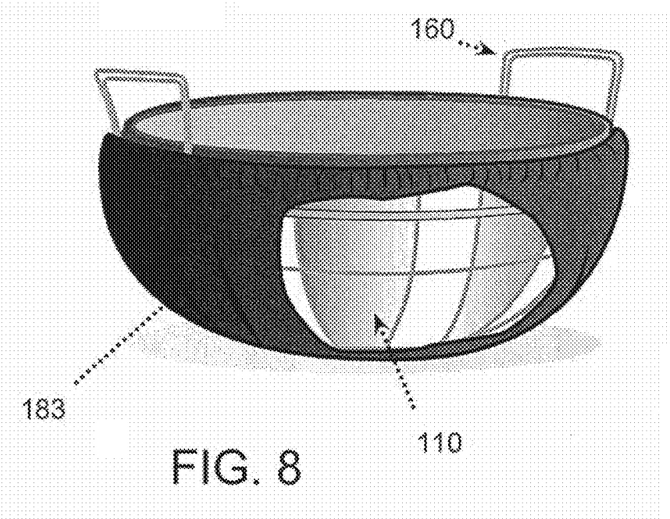
FIG. 8 shows a perspective view of the present invention.
Figure 9:
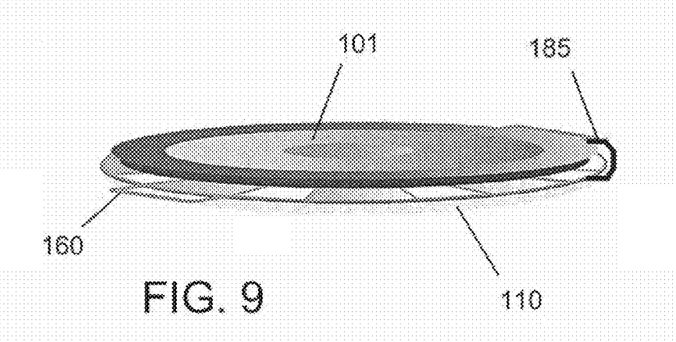
FIG. 9 shows a perspective view of an alternate embodiment of the serving container of the present invention.
Figure 10:
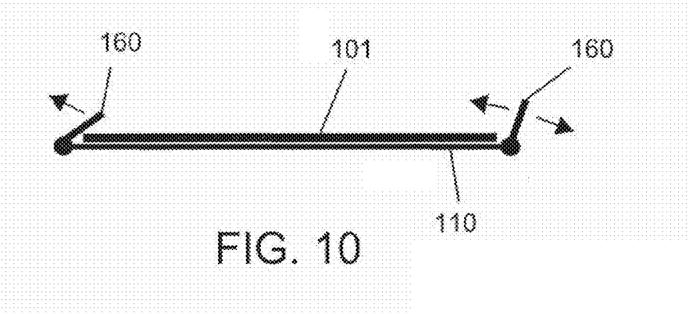
FIG. 10 shows a side view of an alternate embodiment of the present invention.
Figure 11:
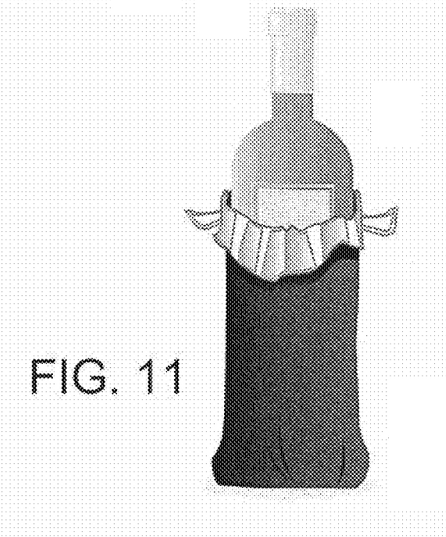
FIG. 11 show a side view of an alternate embodiment of the present invention.

Following is a list of elements corresponding to a particular element referred to herein:
100 Food chilling system
101 Serving container
102 Container edge
110 Circular base
111 Base outer periphery
112 Base top edge
113 Base bottom edge
114 Base side wall
120 Bottom component
121 Bottom component outer periphery
130 Chilling component
131 Chilling component inside edge
132 Chilling component outside edge
133 Chilling component first edge
134 Chilling component second edge
135 Sealed cavity
136 Liquid or gel component
140 Spacing component
141 Spacing component inside edge
142 Spacing component outside edge
143 Spacing component first edge
144 Spacing component second edge
150 Chilling component length
151 Spacing component length
152 Chilling component inside edge width
153 Spacing component inside edge width
154 Chilling component outside edge width
155 Spacing component outside edge width
160 Handle
170 Ring
180 Cord
181 First hook
182 Second hook
183 Shell
184 Opening 185 Clip
190 Plane Referring now to FIG. 1-11, the present invention features a food chilling system (100) for helping keep food items and beverages cold. In some embodiments, the system is for helping keep food items and beverages hot. In some embodiments, the system (100) comprises a generally flexible circular base (110) for wrapping a serving container (101). In some embodiments, the circular base (110) comprises a pliable circular bottom component (120) centrally located in the circular base (110).

In some embodiments, the circular base (110) comprises a plurality of chilling components (130) having an arcuate chilling component inside edge (131), an arcuate chilling component outside edge (132), a straight chilling component first edge (133) and a straight chilling component second edge (134). In some embodiments, each chilling component (130) comprises a sealed cavity (135) located therein. In some embodiments, a freezable liquid or gel component (136) is located in the sealed cavity (135).

In some embodiments, each chilling component (130) comprises a shape of a segment of a circle divided by a plurality of straight lines with a first straight line drawn from a first originating point on a circumference of the circle through a center point of the circle to a first terminating point on the circumference of the circle. In some embodiments, each subsequent straight line is drawn from a next originating point on the circumference of the circle sequentially rotated from the first originating point through the center point of the circle to a next terminating point on the circumference of the circle. In some embodiments, the chilling component inside edge (131) is formed from an arcuately concave notch located at an intersecting point of the chilling component first edge (133) and the chilling component second edge (134) thereon. In some embodiments, each chilling component (130) resembles a shape of a piece of a round pie.

In some embodiments, each chilling component (130) comprises a chilling component length (150) from the chilling component inside edge (131) to the chilling component outside edge (132). In some embodiments, each chilling component (130) comprises a chilling component outside edge width (154) and a chilling component inside edge width (152).

In some embodiments, the circular base (110) comprises a plurality of spacing components (140) having an arcuate spacing component inside edge (141), an arcuate spacing component outside edge (142), a straight spacing component first edge (143) and a straight spacing component second edge (144).

In some embodiments, each spacing component (140) comprises a second shape of a segment of the circle divided by a second plurality of straight lines with the first straight line drawn from the first originating point on the circumference of the circle through the center point of the circle to the first terminating point on the circumference of the circle. In some embodiments, each subsequent line is drawn from a next spacing component originating point on the circumference of the circle sequentially rotated from the first originating point through the center point of the circle to a next spacing component terminating point on the circumference of the circle. In some embodiments, the spacing component inside edge (141) is formed from an arcuately concave notch located at an intersecting point of the spacing component first edge (143) and the spacing component second edge (144) thereon. In some embodiments, each spacing component (140) resembles a shape of a piece of a round pie.

In some embodiments, each spacing component (140) comprises a spacing component length (151) from the spacing component inside edge (141) to the spacing component outside edge (142). In some embodiments, each spacing component (140) comprises a spacing component outside edge width (155) and a spacing component inside edge width (153).

In some embodiments, the spacing component length (151) is equal to the chilling component length (150). In some embodiments, the spacing component inside edge width (153) is less than half the chilling component inside edge width (152). In some embodiments, the spacing component outside edge width (155) is less than half the chilling component outside edge width (154).

In some embodiments, the chilling components (130) are located on the circular bottom alternatingly with the spacing components (140). In some embodiments, the chilling component inside edges (131) are located on a circular bottom component outer periphery (121). In some embodiments, the spacing component inside edges (141) are located on the circular bottom component outer periphery (121).

In some embodiments, the circular base (110) comprises a plurality of flexible handles (160) pivotally located on a base outer periphery (111). In some embodiments, each handle (160) comprises a first position extending out and away from the base outer periphery (111) for carrying, and a second position, folded over a container edge (102) interfacingly against the container (101) for holding the circular base (110) against the serving container (101).

In some embodiments, the circular base (110) comprises a plurality of rings (170) pivotally located on a base side wall (114) thereon. In some embodiments, each ring (170) is located on a plane (190) from a base top edge (112) to a base bottom edge (113). In some embodiments, the rings (170) are between ½ inch and 1-½ inches in diameter. In some embodiments, the rings (170) are not grommets.

In some embodiments, the system (100) comprises an elastic cord (180) having a cord first end and a cord second end. In some embodiments, a first hook (181) is located on the core first end and a second hook (182) is located on the cord second end. In some embodiments, the first hook (181) and the second hook (182) are designed to alternately pass through or engage the plurality of rings (170). In some embodiments, the cord (180) comprises a cord adjustment lock located thereon to temporarily tighten the elastic cord (180) to secure the circular base (110) around the serving container (101).

In some embodiments, the system (100) comprises a flexible, pliable outer shell (183), having a cinchable opening (184) located thereon. In some embodiments, the opening (184) comprises elastic disposed there around. In some embodiments, the opening (184) comprises a cinching cord disposed there around. In some embodiments, the shell (183) is designed to encompass the circular base (110) and the cord (180) after the circular base (110) has been secured to the serving container (101) via the cord (180). In some embodiments, the shell (183) is cloth, nylon or plastic. In some embodiments, the shell (183) helps prevent condensation on the circular base (110). In some embodiments, the shell (183) is rollable and foldable.

In some embodiments, the serving container (101) is placed on the bottom component (120) of the circular base (110). In some embodiments, the chilling components (130) and the spacing components (140) are interfacingly wrapped against a side wall of the serving container (101). In some embodiments, the chilling components (130) and the spacing components (140) are flexible and pliable to conform to the shape of the serving container (101) to provide maximum contact area between the chilling components (130) and the side wall of the serving container (101). In some embodiments, the spacing components (140) are designed to "bunch" up to accommodate different shapes of serving containers (101). In some embodiments, the chilling components (130) and the spacing components (140) of the circular base (110) are held into position securely against the side wall of the serving container (101) via the cord (180). In some embodiments, the shell (183) is placed over the serving container (101) and the circular base (110) and held into position via the cinchable opening. In some embodiments, the circular base (110) and the shell (183) are designed to roll down or fold over to accommodate different heights of the serving container (101).

In some embodiments, the handles (160) are microwaveable. In some embodiments, the cord (180), the first hook (181), the second hook (182), the shell (183) and the circular base (110) are microwaveable. In some embodiments, the ring (170) is microwaveable.

In some embodiments, the system (100) comprises a plurality of clips (185). In some embodiments, the clips (185) are designed to clip the base top edge (112) to the container edge (102).

In some embodiments, the serving container (101) is a semi-hemispherical bowl. In some embodiments, the serving container (101) is a round platter. In some embodiments, the serving container (101) is a bottle.

In some embodiments, the system (100) is equally adept to retain heat in the serving container (101) as to retain cold. In some embodiments, the liquid or gel component (136) may be heated or cooled.

As used herein, the term "about" refers to plus or minus 10% of the referenced number.

The disclosures of the following U.S. Patents are incorporated in their entirety by reference herein: U.S. Patent Application No. 2009/0077997; U.S. Patent Application No. 2008/0066490; U.S. Pat. No. 7,332,011; U.S. Pat. No. 7,089,757; U.S. Pat. No. 6,223,551; U.S. Pat. No. 5,998,879; U.S. Pat. No. 5,345,784; U.S. Pat. No. 5,188,877; U.S. Pat. No. 5,005,374; and U.S. Pat. No. 3,830,676

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A food chilling system (100) for helping keep food items and beverages cold, wherein the system (100) comprises:
   (a) a generally flexible circular base (110) for wrapping a serving container (101), wherein the circular base (110) comprises:
      (i) a pliable circular bottom component (120) centrally disposed in the circular base (110),
      (ii) a plurality of chilling components (130) having an arcuate chilling component inside edge (131), an arcuate chilling component outside edge (132), a straight chilling component first edge (133) and a straight chilling component second edge (134), wherein each chilling component (130) comprises a sealed cavity (135) disposed therein, wherein a freezable liquid or gel component (136) is disposed in the sealed cavity (135),
   wherein each chilling component (130) comprises a shape of a segment of a circle divided by a plurality of straight lines with a first straight line drawn from a first originating point on a circumference of the circle through a center point of the circle to a first terminating point on the circumference of the circle, wherein each subsequent straight line is drawn from a next originating point on the circumference of the circle sequentially rotated from the first originating point through the center point of the circle to a next terminating point on the circumference of the circle, wherein the chilling component inside edge (131) is formed from an arcuately concave notch disposed at an intersecting point of the chilling component first edge (133) and the chilling component second edge (134) thereon,
   wherein each chilling component (130) comprises a chilling component length (150) from the chilling component inside edge (131) to the chilling component outside edge (132), wherein each chilling component (130) comprises a chilling component outside edge width (154) and a chilling component inside edge width (152),
      (iii) a plurality of spacing components (140) having an arcuate spacing component inside edge (141), an arcuate spacing component outside edge (142), a straight spacing component first edge (143) and a straight spacing component second edge (144),
   wherein each spacing component (140) comprises a second shape of a segment of the circle divided by a second plurality of straight lines with the first straight line drawn from the first originating point on the circumference of the circle through the center point of the circle to the first terminating point on the circumference of the circle, wherein each subsequent line is drawn from a next spacing component originating point on the circumference of the circle sequentially rotated from the first originating point through the center point of the circle to a next spacing component terminating point on the circumference of the circle, wherein the spacing component inside edge (141) is formed from an arcuately concave notch disposed at an intersecting point of the spacing component first edge (143) and the spacing component second edge (144) thereon,
   wherein each spacing component (140) comprises a spacing component length (151) from the spacing component inside edge (141) to the spacing component outside edge (142), wherein each spacing component (140) comprises a spacing component outside edge width (155) and a spacing component inside edge width (153),
   wherein the spacing component length (151) is equal to the chilling component length (150), wherein the spacing component inside edge width (153) is less than half the chilling component inside edge width (152), wherein the spacing component outside edge width (155) is less than half the chilling component outside edge width (154),
wherein the chilling components (130) are disposed on the circular bottom alternatingly with the spacing components (140), wherein the chilling component inside edges (131) are disposed on a circular bottom component outer periphery (121), wherein the spacing component inside edges (141) are disposed on the circular bottom component outer periphery (121),
- (iv) a plurality of flexible handles (160) pivotally disposed on a base outer periphery (111), wherein each handle (160) comprises a first position extending out and away from the base outer periphery (111), and a second position, folded over a container edge (102) interfacingly against the container (101), and
- (v) a plurality of rings (170) pivotally disposed on a base side wall (114) thereon, wherein each ring (170) is disposed on a plane (190) from a base top edge (112) to a base bottom edge (113);
- (b) an elastic cord (180) having a cord first end and a cord second end, wherein a first hook (181) is disposed on the cord first end and a second hook (182) is disposed on the cord second end, wherein the first hook (181) and the second hook (182) are designed to alternately pass through or engage the plurality of rings (170), wherein the cord (180) composes a cord adjustment lock disposed thereon to temporarily tighten the elastic cord (180) to secure the circular base (110) around the serving container (101); and
- (c) a flexible, pliable outer shell (183), having a cinchable opening (184) disposed thereon, wherein the shell (183) is designed to encompass the circular base (110) and the cord (180) after the circular base (110) has been secured to the serving container (101) via the cord (180);

wherein the serving container (101) is disposed on the bottom component (120) of the circular base (110), wherein the chilling components (130) and the spacing components (140) are interfacingly wrapped against a side wall of the serving container (101), wherein the chilling components (130) and the spacing components (140) are flexible and pliable to conform to the shape of the serving container (101) to provide maximum contact area between the chilling components (130) and the side wall of the serving container (101), wherein the chilling components (130) and the spacing components (140) of the circular base (110) are held into position securely against the side wall of the serving container (101) via the cord (180), wherein the shell (183) is placed over the serving container (101) and the circular base (110) and held into position via the cinchable opening.

2. The system (100) of claim 1, wherein the handles (160) are microwaveable.

3. The system (100) of claim 1, wherein the system (100) comprises a plurality of clips (185), wherein the clips (185) are designed to clip the base top edge (112) to the container edge (102).

4. The system (100) of claim 1, wherein the serving container (101) is a semi-hermispherical bowl.

5. The system (100) of claim 1, wherein the serving container (101) is a round platter.

6. The system (100) of claim 1, wherein the serving container (101) is a bottle.

7. A food chilling system (100) for helping keep food items and beverages cold, wherein the system (100) consists of:

- (a) a generally flexible circular base (110) for wrapping a serving container (101), wherein the circular base (110) consists of:
  - (i) a pliable circular bottom component (120) centrally disposed in the circular base (110),
  - (ii) a plurality of chilling components (130) consisting of an arcuate chilling component inside edge (131), an arcuate chilling component outside edge (132), a straight chilling component first edge (133) and a straight chilling component second edge (134), wherein each chilling component (130) consists of a sealed cavity (135) disposed therein, wherein as freezable liquid or gel component (136) is disposed in the sealed cavity (135), wherein each chilling component (130) consists of a shape of a segment of a circle divided by a plurality of straight lines with a first straight line drawn from a first originating point on a circumference of the circle through a center point of the circle to a first terminating point on the circumference of the circle, wherein each subsequent straight line is drawn from a next originating point on the circumference of the circle sequentially rotated from the first originating point through the center point of the circle to a next terminating point on the circumference of the circle, wherein the chilling component inside edge (131) is formed from an arcuately concave notch disposed at an intersecting point of the chilling component first edge (133) and the chilling component second edge (134) thereon, wherein each chilling component (130) consists of a chilling component length (150) from the chilling component inside edge (131) to the chilling component outside edge (132), wherein each chilling component (130) consists of a chilling component outside edge width (154) and a chilling component inside edge width (152),

- (iii) a plurality of spacing components (140) consisting of an arcuate spacing component inside edge (141), an arcuate spacing component outside edge (142), a straight spacing component first edge (143) and a straight spacing component second edge (144), wherein each spacing component (140) consists of a second shape of a segment of the circle divided by a second plurality of straight lines with the first straight line drawn from the first originating point on the circumference of the circle through the center point of the circle to the first terminating point on the circumference of the circle, wherein each subsequent line is drawn from a next spacing component originating point on the circumference of the circle sequentially rotated from the first originating point through the center point of the circle to a next spacing component terminating point on the circumference of the circle, wherein the spacing component inside edge (141) is formed from an arcuately concave notch disposed at an intersecting point of the spacing component first edge (143) and the spacing component second edge (144) thereon, wherein each spacing component (140) consists of a spacing component length (151) from the spacing component inside edge (141) to the spacing component outside edge (142), wherein each spacing component (140) consists of a spacing component outside edge width (155) and a spacing component inside edge width (153), wherein the spacing component length (151) is equal to the chilling component length (150), wherein the spacing component inside edge width (153) is less than half the chilling component inside edge width (152), wherein the spacing component outside edge width (155) is less than half the chilling component outside edge width (154), wherein the chilling components (130) are disposed on the circular bottom alternatingly with the spacing components (140), wherein the chilling component inside edges (131) are disposed on a circular bottom component outer periphery (121), wherein the spacing component inside edges (141) are disposed on the circular bottom component outer periphery (121),     (iv) a plurality of flexible handles (160) pivotally disposed on a base outer periphery (111), wherein each handle (160) consists of a first position extending out and away from the base outer periphery (111), and a second position, folded over a container edge (102) interfacingly against the container (101), and     (v) a plurality of rings (170) pivotally disposed on a base side wall (114) thereon, wherein each ring (170) is disposed on a plane (190) from a base top edge (112) to a base bottom edge (113);

(b) an elastic cord (180) consisting of a cord first end and a cord second end, wherein a first hook (181) is disposed on the cord first end and a second hook (182) is disposed on the cord second end, wherein the first hook (181) and the second hook (182) are designed to alternately pass through or engage the plurality of rings (170), wherein the cord (180) consists of a cord adjustment lock disposed thereon to temporarily tighten the elastic cord (180) to secure the circular base (110) around the serving container (101); and (c) a flexible, pliable outer shell (183), consisting of a cinchable opening (184) disposed thereon, wherein the shell (183) is designed to encompass the circular base (110) and the cord (180) after the circular base (110) has been secured to the serving container (101) via the cord (180);

wherein the serving container (101) is disposed on the bottom component (120) of the circular base (110), wherein the chilling components (130) and the spacing components (140) are interfacingly wrapped against a side wall of the serving container (101), wherein the chilling components (130) and the spacing components (140) are flexible and pliable to conform to the shape of the serving container (101) to provide maximum contact area between the chilling components (130) and the side wall of the serving container (101), wherein the chilling components (130) and the spacing components (140) of the circular base (110) are held into position securely against the side wall of the serving container (101) via the cord (180), wherein the shell (183) is placed over the serving container (101) and the circular base (110) and held into position via the cinchable opening.

8. A food chilling system (100) for helping keep food items and beverages cold, wherein the system (100) comprises:

(a) a generally flexible circular base (110) for wrapping a serving container (101), wherein the circular base (110) comprises:

(i) a pliable circular bottom component (120) centrally disposed in the circular base (110),     (ii) a plurality of chilling components (130) having an arcuate chilling component inside edge (131), an arcuate chilling component outside edge (132), a straight chilling component first edge (133) and a straight chilling component second edge (134), wherein each chilling component (130) comprises a sealed cavity (135) disposed therein, wherein a freezable liquid or gel component (136) is disposed in the sealed cavity (135), wherein each chilling component (130) comprises a shape of a segment of a circle divided by a plurality of straight lines with a first straight line drawn from a first originating point on a circumference of the circle through a center point of the circle to a first terminating point on the circumference of the circle, wherein each subsequent straight line is drawn from a next originating point on the circumference of the circle sequentially rotated from the first originating point through the center point of the circle to a next terminating point on the circumference of the circle, wherein the chilling component inside edge (131) is formed from an arcuately concave notch disposed at an intersecting point of the chilling component first edge (133) and the chilling component second edge (134) thereon, wherein each chilling component (130) comprises a chilling component length (150) from the chilling component inside edge (131) to the chilling component outside edge (132), wherein each chilling component (130) comprises a chilling component outside edge width (154) and a chilling component inside edge width (152),     (iii) a plurality of spacing components (140) having an arcuate spacing component inside edge (141), an arcuate spacing component outside edge (142), a straight spacing component first edge (143) and a straight spacing component second edge (144), wherein each spacing component (140) comprises a second shape of a segment of the circle divided by a second plurality of straight lines with the first straight line drawn from the first originating point on the circumference of the circle through the center point of the circle to the first terminating point on the circumference of the circle, wherein each subsequent line is drawn from a next spacing component originating point on the circumference of the circle sequentially rotated from the first originating point through the center point of the circle to a next spacing component terminating point on the circumference of the circle, wherein the spacing component inside edge (141) is formed from an arcuately concave notch disposed at an intersecting point of the spacing component first edge (143) and the spacing component second edge (144) thereon, wherein each spacing component (140) comprises a spacing component length (151) from the spacing component inside edge (141) to the spacing component outside edge (142), wherein each spacing component (140) comprises a spacing component outside edge width (155) and a spacing component inside edge width (153), wherein the chilling components (130) are disposed on the circular bottom alternatingly with the spacing components (140), wherein the chilling component inside edges (131) are disposed on a circular bottom component outer periphery (121), wherein the spacing component inside edges (141) are disposed on the circular bottom component outer periphery (121),     (iv) a plurality of handles (160) disposed on a base outer periphery (111).

wherein the serving container (101) is disposed on the bottom component (120) of the circular base (110), wherein the chilling components (130) and the spacing components (140) are interfacingly wrapped against a side wall of the serving container (101), wherein the chilling components (130) and the spacing components (140) are flexible and pliable to conform to the shape of the serving container (101) to provide maximum contact area between the chilling components (130) and the side wall of the serving container (101), wherein the chilling components (130) and the spacing components (140) of the circular base (110) are held into position securely against the side wall of the serving container (101) via a cord (180), wherein the shell (183) is placed over the serving container (101) and the circular base (110) and held into position via the cinchable opening.

* * * * *